US010664776B1

(12) United States Patent
Fakhouri (10) Patent No.: US 10,664,776 B1
(45) Date of Patent: May 26, 2020

(54) INTEGRATED PROGRESS VIEWER (71) Applicant: Pivotal Software, Inc., San Francisco, CA (US)

(72) Inventor: Onsi Joe Fakhouri, San Francisco, CA (US)

(73) Assignee: Pivotal Software, Inc., San Francisco, CA (US)

( * ) Notice: Subject to any disclaimer, the term of this patent is extended or adjusted under 35 U.S.C. 154(b) by 668 days.

(21) Appl. No.: 15/377,385

(22) Filed: Dec. 13, 2016

(51) Int. Cl.
*G06Q 10/06* (2012.01)
*G06Q 10/10* (2012.01)
*G06F 3/0481* (2013.01)

(52) U.S. Cl.
CPC ... *G06Q 10/063114* (2013.01); *G06F 3/0481* (2013.01); *G06Q 10/103* (2013.01); *G06F 2203/04803* (2013.01)

(58) Field of Classification Search
CPC ............ G06F 17/30; G06F 1/00; G06F 21/00; G06Q 10/00; G06Q 99/00
See application file for complete search history.

(56) References Cited

U.S. PATENT DOCUMENTS

| | | | |
|---|---|---|---|
| 2003/0222896 A1* | 12/2003 | Hagmann | G06Q 10/06 715/700 |
| 2006/0200372 A1 | 9/2006 | O'Cull et al. | |
| 2007/0162308 A1* | 7/2007 | Peters | G06F 19/328 705/2 |
| 2009/0193353 A1 | 7/2009 | Sharp et al. | |
| 2012/0265744 A1* | 10/2012 | Berkowitz | G06Q 30/06 707/705 |
| 2014/0157177 A1 | 6/2014 | Ghadge | |
| 2015/0030011 A1* | 1/2015 | Liu | H04L 1/1893 370/336 |

OTHER PUBLICATIONS

Sanchez, Hynuk & Robert, Benoît. (2010). Measuring Portfolio Strategic Performance Using Key Performance Indicators. Project Management Journal. 41. 64-73. 10.1002/pmj.20165. (Year: 2010).*

* cited by examiner

*Primary Examiner* — Alan S Miller
*Assistant Examiner* — Jay-Ming Wang
(74) *Attorney, Agent, or Firm* — Fish & Richardson P.C.

(57) ABSTRACT

This specification describes methods, systems, and computer readable media for representing progresses of multiple projects in an integrated progress view. In an integrated progress view, visual indicators can represent a respective degree of completion of each project, as well as additional information on the project. The additional information indicates velocity of the progresses and resources used to achieve the velocity. Measurements of completion, including milestones achieved in and resources consumed by each project, are individually configurable in a distributed manner. For example, a user interface can allow a first project manager to configure how to measure progress of a first project, and a second project manager to configure how to measure progress of a second project. The integrated progress view can provide a summary view of progresses of the projects, even when measurements of the progresses are configured differently.

20 Claims, 4 Drawing Sheets

FIG. 4

INTEGRATED PROGRESS VIEWER

BACKGROUND

This specification generally relates to visual tools for project scheduling.

A project-planning tool can help project managers to form realistic expectations about when work might be completed based on a team's ongoing performance. The project-planning tool, e.g., a Pivotal Tracker® tool, visualizes a project workflow moving through time. The tool allows project managers to break down projects into manageable chunks and set deliverables and scope of each project.

Project scheduling can include scheduling multiple activities in a project. In a project-planning tool, e.g., Gantt chart, the activities can be represented by horizontal bars, stretching along a dimension of time. Each bar can represent an activity. A horizontal position of the bar indicates duration of the corresponding activity. The duration, e.g., number of days, is a period of time that a corresponding activity took, or is scheduled to take, to complete. At a given time represented in the horizontal time dimension, the horizontal bars can show activities that are completed, that are ongoing, and that have not started yet at that given time.

SUMMARY

This specification describes methods, systems, and computer-readable media for representing progresses of multiple projects in an integrated progress view. In an integrated progress view, visual indicators can represent a respective degree of completion of each project, as well as additional information on the project. The projects can be related to one another or independent from one another. The additional information indicates velocity of the progresses and resources used to achieve the velocity. Measurements of completion, including milestones achieved in and resources consumed by each project, are individually configurable in a distributed manner. For example, a user interface can allow a first project manager to configure how to measure progress of a first project, and a second project manager to configure how to measure progress of a second project. The integrated progress view can provide a summary view of progresses of the projects, even when measurements of the progresses are configured differently.

Particular embodiments of the subject matter described in this specification can be implemented to realize one or more of the following example advantages. The techniques discussed in this specification are suitable for a distributed computing environment. In addition to centralized project management, the disclosed techniques allow distributed project management, where multiple project managers can configure respective individual projects. The disclosed techniques provide a user interface to configure milestones, progress measures, and resources for each individual project from different user devices. Progresses for the projects can be updated automatically, from services provided by the distributed computing platform. Compared to conventional project management tools, e.g., Gantt charts, the integrated progress view provides more information in the same amount of display real estate, thereby solving the technical problem of presenting more information in limited display space. An integrated progress view can show resources usage, progress velocity together, thus improving upon conventional project management tools. Accordingly, a computer system implementing the disclosed techniques improves upon conventional computer systems, at least in terms of efficiency in presenting complex project information.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

Figure 1:
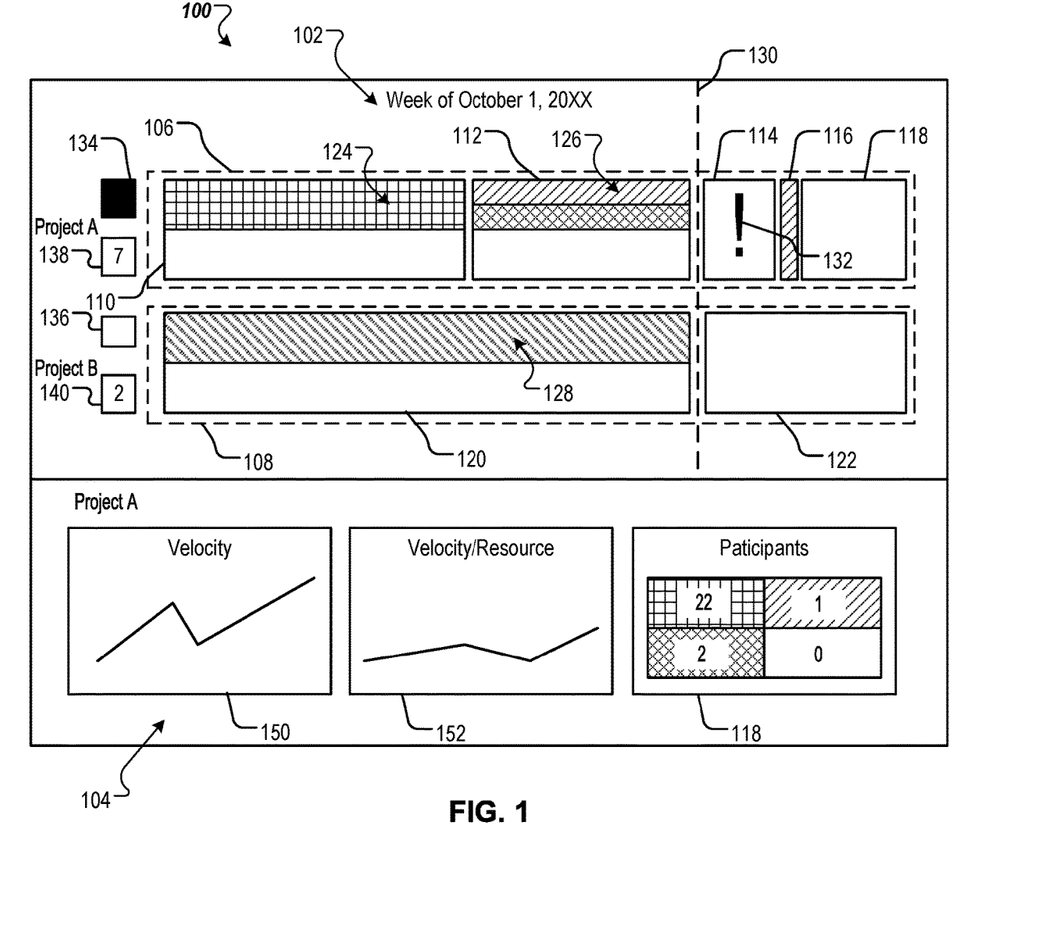
FIG. 1 is a diagram illustrating an example user interface including an integrated progress view.

FIG. 1 is a diagram illustrating an example user interface including an integrated progress view 100. A system of one or more computer processors can generate the integrated progress view 100 using data submitted by multiple user devices, and provide the integrated progress view 100 for presentation on a display device, on a printer, or on a similar presentation device. The presentation can be handled by a server computer or a user device. The system can be a stand-alone system, a networked system, or a part of a distributed computing system, e.g., a cloud computing platform.

The system can generate multiple sections of the integrated progress view 100, each section representing a particular view of a group of projects. In the example shown, the integrated progress view 100 has a progress pane 102 and a metrics pane 104. The progress pane 102 of the integrated progress view 100 is configured to present one or more progress indicators each corresponding to a respective project. The metrics pane 104 is configured to display metrics of the one or more projects, individually, as a whole, or both. In the example shown, the progress pane 102 is displayed next to and on top of the metrics pane 104. In various implementations, relative positions of the progress pane 102 and the metrics pane 104 can have various configurations. For example, the system can display the progress pane 102 and the metrics pane 104 side-by-side, stacked on top of one another, or in separate and individually resizable windows.

The system can present multiple progress indicators in the progress pane 102. In the example shown, the system presents progress indicators 106 and 108 in the progress pane 102. In the example shown, a respective frame in dashed lines encloses each of the progress indicator 106 and progress indicator 108. The frames are for clarity purposes. In various implementations, a progress indicator may or may not be framed.

Each of the progress indicators 106 and 108 corresponds to a respective project. In general, a project can be a set of tasks grouped together. For example, a project can include a series of tasks having interdependencies, e.g., task X must be completed before task Y can start, and a common goal, e.g., for releasing a product having multiple new features. A project can correspond to a group of developers or computers (e.g., a team), a product, or a release. The tasks in the projects can include work performed by humans, e.g., completion of certain features in a product, work performed by machines, e.g., a job executing on a computer, or both. Each task, when associated with an identifier and a description, can be referred to as a story.

Each of the progress indicators 106 and 108 is individually and independently configurable. A user device can logon to the system and define each project and configure respective tasks, subtasks, milestones, target dates, dependencies and resources of each project. For example, a first user device can configure a first project, Project A by defining tasks for the first project based on first user input. The system, upon receive the definition of Project A, associates Project A with the progress indicator 106. A second user device can define tasks for a second project, Project B based on second user input. The system then associates the second project with the progress indicator 108. The system can determine that Project A and Project B are going to be presented in the same integrated progress view 100 upon receiving information from the user devices indicating that Project A and Project B belong to a same project group associated with the integrated progress view 100.

Each of the progress indicators 106 and 108 can include multiple segments corresponding to respective tasks in the project. For example, the progress indicator 106 includes segments 110, 112, 114, 116 and 118. Likewise, the progress indicator 108 includes segments 120 and 122.

Each of the segments 110, 112, 114, 116, 118, 120 and 122 corresponds to a respective task. Sizes, e.g., widths, of the segments 110, 112, 114 and 116 represent complexity of the tasks, as measured by respective number of tracker points of each task. As used in this specification, a "tracker point" is a generic term for measuring an amount of work in a task or complexity of a task. Each tracker point can correspond to unit of a task. A user device can be configured to define number of tracker points for a task based on user input. For example, the user device can assign four tracker points to a project designated by a user as "highly complex," three tracker points to a project designated as "complex," two tracker points to a project designated as "medium" and one tracker point to a project designated as "easy." An example of a tracker point is a point in the Pivotal Tracker® tool.

Each of the segments 110, 112, 114, 116, 118, 120 and 122 can have a background and, optionally, a banner. The background forms the body of a segment. The banner can overlay on the background. The background can have a color, shade or pattern, indicating a type of the task represented by the segment. For convenience, in FIG. 1, the respective background of each of the segments 110, 112 and 120 is shown in the lower half of the respective segment. The type of a task can be selected by a user device from a set of predefined types, or be custom defined by a user device. The predefined types can include, for example, "to complete a feature," "to fix a bug," "a chore" or "a release."

For example, the background of segment 110 has a first color indicating that the type of the task represented by the segment 110 is to complete a feature. The background of segment 112 has a second color indicating that the type of the task represented by the segment 112 is to fix a bug. The background of segment 120 has a third color indicating that the type of the task represented by the segment 120 is to chore.

The backgrounds for segments 114, 116, 118 and 122 are shown in the segments in the entirety. The backgrounds for segments 114, 118 and 122 can have a fourth color, indicating that the type of the tasks represented by the segments 114, 118 and 122 correspond to a feature that does not have a type. The background for segment 116 can have a fifth color, indicating that the type of the tasks represented by the segment 116 is a release.

In the example shown in FIG. 1, the system masks the segments 110, 112 and 120 with banners 124, 126 and 128, respectively. The banners 124, 126 and 128 indicate status of the tasks represented by the segments 110, 112 and 120. The status can correspond to predefined or custom-specified marker points during development, referred in this specification as milestones. Examples of milestones include "task started," "task started and in progress," "task started and on hold," "finished, awaiting delivery," "result delivered, waiting for response," "result delivered and accepted" and "result delivered and rejected," among others.

The system can receive the milestones and status updates from various user devices. For example, a user device can define a task for Project A and notifies the system of the newly defined task, including the milestones. In response, the system generates and displays a segment, e.g., the segment 114 to represent the task. Before the task reaches a first milestone, e.g., before the task starts, the system displays a transparent banner over the background. Accordingly, only the background is visible.

In some implementations, the user device can receive, from a status update source, e.g., from a bug database update, an indication that a task has reached the first milestone, e.g., started. The user device notifies the system of the starting of the task. In some implementations, the system receives the update from the status update source directly. In either case, the system can then overlay a banner on the background to indicate this status. For example, the system can overlay banner 128 over segment 120. The banner 128 can have a first color, shade, or pattern indicating that a task represented by segment 120 has reached a first milestone, e.g., has started. Banner 128 is shown to be located at a top portion of the segment 120. In various implementations, the system can place the banner 128 at the middle portion or bottom portion of the segment 120.

The system can add banners 124 and 126 to the segments 110 and 112, respectively. Each of the banners 124 and 126 has a respective color, shade, or pattern indicating a status of a respective task. The system can use different colors, shades, or patterns to indicate different status. For example, the banner 124 has a pattern indicating that the task represented by the segment 110 is finished, awaiting delivery. The banner 126 has a pattern indicating that the task represented by the segment 112 hit a specified milestone and now has a status corresponding to hitting that milestone. For example, the banner 126 can indicate that the task is delivered, awaiting acceptance. Other status can include, for example, a task is delivered and accepted, or delivered and rejected. The system can obtain the status from updates from user devices. An update in a database, or a text message, can trigger a status update.

The system can receive, from a user device, a specification that a task represented by the segment 114 can start only if a particular milestone of another task has been reached, e.g., when the result of the task represented by the segment 112 is delivered and accepted. The system can determine that, at a current time, as represented by a time bar 130, the status of the task represented by the segment 112 has been delivered but has not been accepted. Accordingly, the system determines that the task represented by the segment 114 is currently blocked and cannot commence. Accordingly, the system can display a warning sign 132, to indicate that this task cannot progress until a blocker has been resolved.

In some implementations, the system determines one or more health indicators for each project. The health indicators can indicate whether a project is developing smoothly and on schedule. For example, based on updates received from a user device, the system can determine whether a project hit a roadblock. The system can determine that a project hits a roadblock in response to determining, for example, that a velocity of tasks for the project is less than a threshold number. The system can measure the velocity of a task by determining a ratio of number of tracker points completed over a duration that the tracker points are completed. The threshold number, e.g., three, can be a pre-specified number or a number determined by averaging historical velocity. In response to determining that the project hits a roadblock, the system can present a user interface item, e.g., an icon 134, next to the project to indicate a roadblock status.

Based on updates received from a user device, the system can determine whether a project is in an early stage or stagnant stage. The system can make the determination based on a comparison between tracker points completed and a scaled velocity. The system can determine a scaler k (e.g., 0.5) based on user input or historical data. In response to determining that completed tracker points are fewer than the velocity times the scaler, the system can present a user interface item, e.g., an icon 136, next to the project to indicate an early stage or stagnant status.

Based on updates received from a user device, the system can determine whether a project is in a near completion stage. The system can make the determination based on a count of tasks in the project that have accepted or rejected status. In response to determining that the tasks in the project that have accepted or rejected status exceeds a threshold number, the system can present a user interface item, e.g., an icon, next to the project to indicate near completion stage status.

Based on updates received from a user device, the system can determine whether a project is in a pending stage. The system can make the determination based on a count of tasks in the project that have delivered but not yet accepted status. In response to determining that the tasks in the project that have delivered but not yet accepted status exceeds a threshold number, the system can present a user interface item, e.g., an icon, next to the project to indicate near completion status.

Based on updates received from a user device, the system can determine vital metrics for each project. For example, based on number of distinct identifiers updating a bug database, the system can determine a number of workers, e.g., programmers, working in a team or on a project. The system can present a digital gauge 138 to indicate the number of workers. Likewise, the system can determine a velocity of a project, a number of tracker points completed on a project, or both. The system can present a digital gauge 140 to indicate the velocity or tracker points completed.

In various implementations, the system can determine the status, health indicators, and metrics based on inputs from various resources assigned to each project. The resources can be a group of people, e.g., programmers or drivers, a group of machines, e.g., computers or trucks, or various combinations of the above, assigned to the project. A user device, e.g., a computer of a project manager, can associate one or more specific resources to a project. The system receives input from the user device specifying a resource identifier corresponding to each of the one or more specific resources. The system aggregates all resources corresponding to the resource identifiers. As a result, the system does not need an input of a viewer of the integrated progress view 100. The system can act as a monitor of progresses of a projected contributed by each computer of the individual resource.

The system indicates amount and type of resources used by tasks of each project automatically. The system can receive input from user devices that contributes a task, checks in a task, or reviews a task. For example, a user device can be a device operated by a programmer, rather than a project manager. When the programmer operates the user device to contribute a task, the user device selects the task based on user input. The user device then submits an identifier of the user device, an identifier of the programmer, and an identifier of the task to the system. The system determines, based on the identifiers, that the user device or programmer has been assigned to a particular project or a particular developer group. The system then calculates various metrics for each project.

In metrics pane 104, the system presents metrics of projects in more details than those presented in the digital gauges 138 or 140. The system can present the metrics pane 104 in response to a user's selection of a project, e.g., by clicking a label "Project A" associated with the project. In the metrics pane 104, the system can present multiple user interface items, e.g., gauges, that indicate various aspects of the project based on input from user devices. For example, the system can present a velocity gauge 150, performance gauge 152, and participant gauge 154.

Based on updates from one or more user devices reporting tasks reaching tracker points, and timestamps associated with the updates, the system can determine respective velocities of tasks in the project. The system can present the velocities, as a function of time, in the velocity gauge 150. For convenience, only a representation of velocity over time is shown in FIG. 1. In various implementations, the system can present the velocity, as measured by tracker points, in bands of individual time periods (e.g., weeks or months). In some implementations, the system measures velocity by number of tasks, grouped by task type, instead of, or in addition to, measuring velocity in terms of tracker points. For example, the system can measure the velocity in terms of number of features, number of bugs, number of bugs, etc. The system can overlay the various measurements in the velocity gauge 150, for example, by using various color coding.

Based on updates from one or more user devices reporting tasks reaching tracker points, and based on submissions by one or more user devices or by record in various product tracking databases, the system determines number of contributors to the project as a function of time. The system can present the number in participant gauge 154. In addition, the system can categorize the contributors according to various criteria based on user selection. For example, the system can categorize the contributors by location, where contributors in each regional office are aggregated for that office. The system can then display a number for each office in a respective color, shade or pattern, and displays the respective numbers, in this example, 22, 1, 2, and 0 for each of four regional offices, respectively. Instead of or in addition to categorizing by location, the system can categorize based on various factors including by seniority, by rank or by business division, among others.

Based on updates from one or more user devices and based on the number of contributors, the system can determine performance of contributors of a project. The system can measure the performance in terms of velocity per contributor. The system can present the performance, as a function of time, in performance gauge 152. The system can present different color, shade, or pattern for different performance bands. For example, the system can present a first color band for a performance range between zero to two tracker points per contributor, a second color band for a performance range between two to three tracker points per contributor, and a third color band for a performance range above three tracker points per contributor. The system can display the color bands across the performance gauge 152. Accordingly, the performance as a function of time can be overlaid on the color bands.

Figure 2:
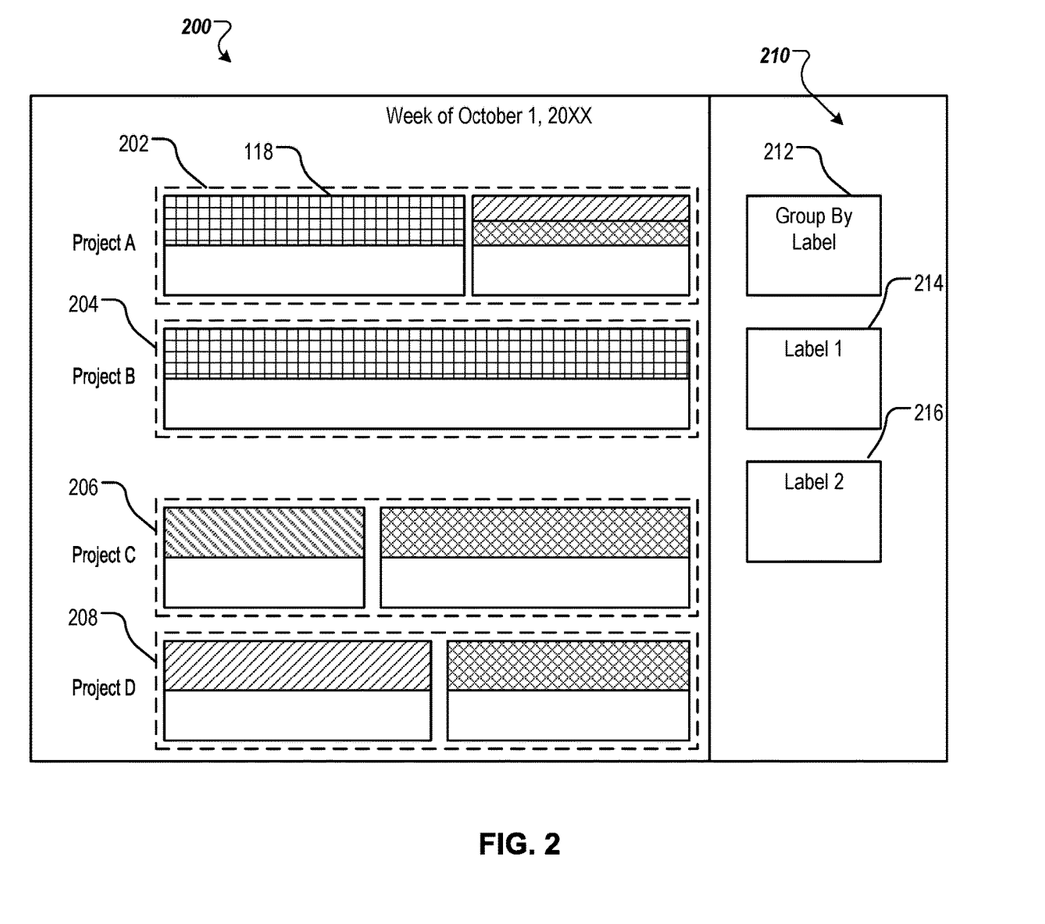
FIG. 2 is a diagram illustrating an example user interface of grouping projects in an integrated progress view.

FIG. 2 is a diagram illustrating an example user interface 200 of grouping projects in an integrated progress view. The system described in reference to FIG. 1 can receive, from a user device, one or more labels for each project, one or more labels for each task, or both. The system can then associate the project and the task with the corresponding labels. The system can then organize the projects and the tasks according to the labels, based on user input. The system can provide the user interface 200 that allows a user to organize the display of progress indicators of the project based on the labels. The user interface 200 can be a pane of the integrated progress view 100 as described in reference to FIG. 1.

In the example shown, the system displays progress indicators 202, 204, 206 and 208 in the user interface 200. The progress indicators 202, 204, 206 and 208 correspond to four projects, Project A through Project D, respectively. Each of the progress indicators 202, 204, 206 and 208 has a respective structure, including segments, backgrounds and banners that is similar to the structures of progress indicators 106 and 108 as described in reference to FIG. 1.

The system can receive from a user device multiple labels, e.g., Label 1 and Label 2. The user device can specify that Label 1 is associated with Projects A, B and C, and that Label 2 is associated with Projects B and D. The system can associate the labels and projects in a database, accordingly. The system provides for display on a display device a grouping pane 210. In the grouping pane 210, the system presents an option 212 for grouping the progress indicators 202, 204, 206 and 208 by label. The system presents selectable items 214 and 216, corresponding to Label 1 and Label 2, respectively. The system can receive a user input selecting the selectable items 214, 216 or both. In response to receiving the user selection, the system can display those progress indicators 202, 204, 206 and 208 that correspond to the projects of selected label or labels. Thus, when there are more projects in the database than can be displayed on a single screen, the system can use the label as a filtering and organizing tool for selecting and displaying progress of only a portion of the projects.

Figure 3:
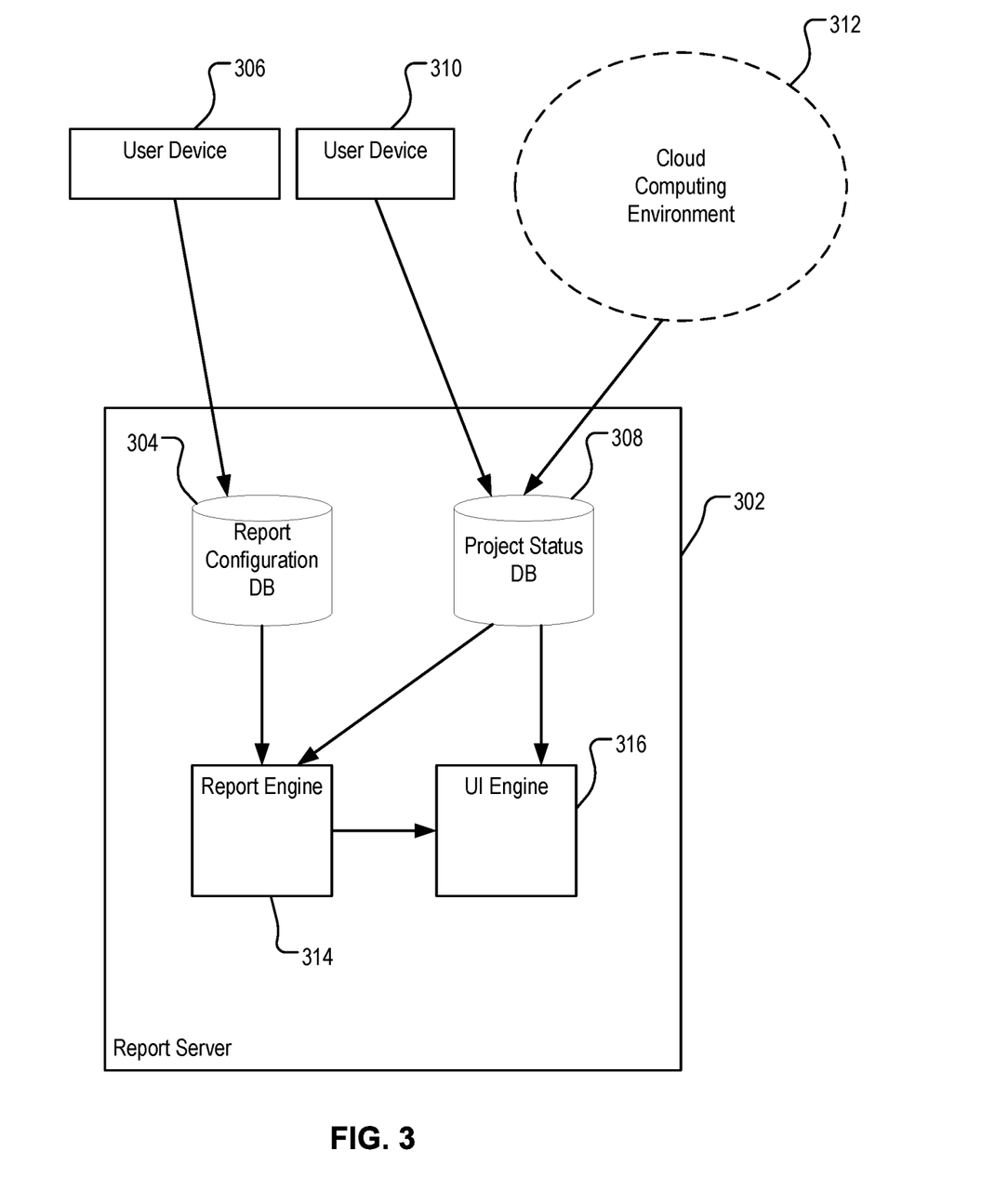
FIG. 3 is a block diagram illustrating components of an example report server providing an integrated progress view.

FIG. 3 is a block diagram illustrating components of an example report server 302 providing an integrated progress view. The report server 302 can include the system described in reference to FIG. 1 and FIG. 2. Each component of the report server 302 can be implemented by one or more computer processors.

The report server 302 can include, or be coupled to, a report configuration database 304. The report configuration database 304 stores essential configurations of an integrated progress view, including information on the following: projects to be shown in an integrated progress view; names of the projects; milestones of each project; tasks in each project; numbers tracker points of each task; type of each task; dependencies between tasks; labels of the projects and tasks, among others. The report server 302 can populate the report configuration database 304 from multiple user devices, e.g., a user device 306.

For example, in a software development environment, a user, e.g., a project manager or team leader, can log into the report server 302 and input information on a project the user is responsible for, from the user device 306. The report server 302 can aggregate inputs from multiple users to create a body of configurations.

The report server 302 can include, or be coupled to, a project status database 308. The project status database 308 stores status of the projects. The status can include time-based information on, for example, which part of the project has not started yet, which part is in progress, and which part is completed. The report server 302 can populate the project status database 308 using inputs from user devices. The report server 302 can aggregate manual input from a user device 310 and input generated by one or more computers in a cloud-based computing environment 312 that are designated as user devices. The computers can be designated as "user devices" relative to the report server 302, while serving as server computers for other devices. The input generated by computers in the cloud-based computing environment 312 can include, for example: updates on bug databases triggered by bug entry, escalation, assignment and resolution; updates on release databases triggered by branching, QA, release, and deprecation; updates on source control databases triggered by code checkout, check in, review, and approval.

The report server 302 is configured to monitor the user devices and update the project status database 308 in response to receive input from any of the user devices. Accordingly, the report server 302 can monitor the progress of various projects without being limited to a single data entry point.

The report server 302 includes a report engine 314. The report engine 314 is a component configured to determine various metrics of projects specified in the report configuration database 304 based on status information stored in the project status database 308. The metrics can include the velocities, performances, health indicators, and other calculated attributes on the progress of each project. The report server 302 then provides the metrics to a UI engine 316.

The UI engine 316 is a component of the report server 302 configured to generate, based on status information stored in the project status database 308 and the metrics output from the report engine 314, integrated progress views for multiple projects. The UI engine 316 can receive user input grouping and organizing the integrated progress views based on labels, and respond accordingly. The UI engine 316 can also generated voice output, video output or other output in addition to the graphic display.

Figure 4:
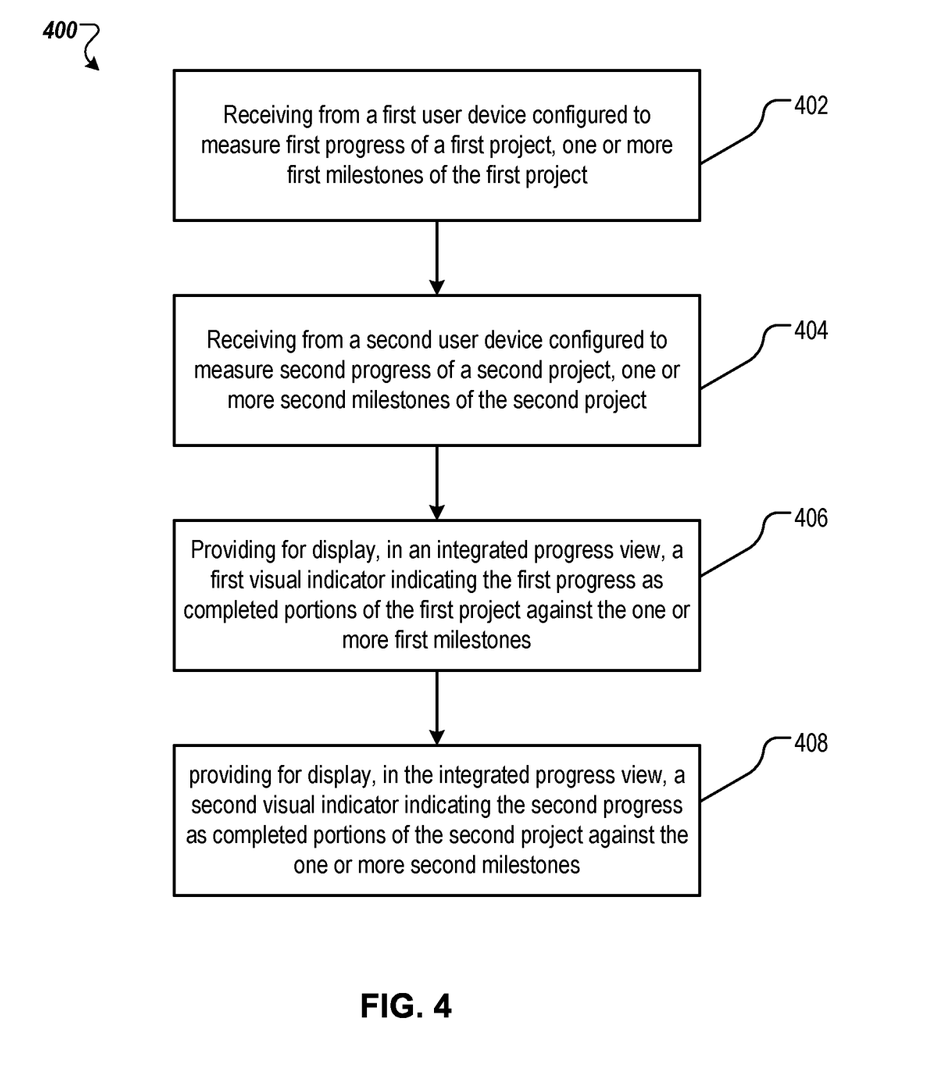
FIG. 4 is a flowchart illustrating an example process of presenting an integrated progress view.

FIG. 4 is a flowchart illustrating an example process 400 of providing an integrated progress view. The process 400 can be performed by a report server, e.g., the report server 302 as described above in reference to FIG. 3.

The report server receives (402) from a first user device configured to measure first progress of a first project, one or more first milestones of the first project. Each milestone can be defined by a status, e.g., in progress, delivered and rejected, delivered and accepted, or delivered and awaiting acceptance. The first user device can be a device configuring the integrated progress view, providing live updates for the integrated progress view, or both.

The report server receives (404), from a second user device configured to measure second progress of a second project, one or more second milestones of the second project. The second project can be related to the first project, or independent from the first project. The second user device can be a device configuring the integrated progress view, providing live updates for the integrated progress view, or both. The second user device can be different from the first user device. The report server thus aggregates inputs from multiple user devices to generate the integrated progress view.

The report server provides (406) for display, in the integrated progress view, a first visual indicator indicating the first progress as completed portions of the first project against the one or more first milestones. The completed portions can be measured by number of tasks in the project, number of tracker points in the project, or a combination of the above.

The report server provides (408) for display, in the integrated progress view, a second visual indicator indicating the second progress as completed portions of the second project against the one or more second milestones. Each of the first visual indicator and the second visual indicator is associated with a respective display attribute indicating a respective velocity of the first progress and the second progress. Unlike conventional progress indicators that, for example, use a length of a progress bar to indicate a degree of progress, each display attribute indicating progress can be a color, shade or pattern that is different from a size of the first or second visual indicator.

For example, the report server can display, for each visual indicator, a background and a banner over the background. The background can have a background color, background shade or background pattern. The background color, background shade or background pattern can indicate a type of a feature of the first project. The banner can have a banner color, banner shape or banner pattern indicating a status of the first progress or the second progress as measured against the one or more first or second milestones.

The report server can provide for display, in the integrated progress view, a summary visual indicator indicating a summary velocity at which the first project and the second project are completed. In some implementations, each of the first visual indicator and second visual indicator is associated with a respective health indicator indicating potential roadblocks of the respective progress and a respective digital gauge presenting metrics of the respective progress.

In some implementations, each of the first visual indicator and second visual indicator includes, respectively, a first section corresponding to a first feature, and a second section corresponding to a second feature. Each section can have a respective size that corresponds to a number of tracker points in a corresponding feature.

In some implementations, each of the first project and second project is associated with a respective label. Each label can be associated with a respective display item that, upon selection, triggers a display of a grouping of visual indicators corresponding to projects being associated with the selected label. Alternatively, or in addition, each label, upon selection, can further trigger a display in the integrated progress view of an aggregated velocity indicator of progresses of projects being associated with the selected label.

In some implementations, each velocity is represented in a summary velocity chart in the integrated view. The summary velocity chart includes a velocity per participant indicator indicating the velocities averaged over number of project participants.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method performed by one or more computers, the method comprising:

receiving first data representing a plurality of first tasks belonging to a first project of a plurality of projects, wherein the first data specifies one or more first milestones achieved respectively by one or more of the first tasks belonging to the first project;

receiving second data representing a plurality of second tasks belonging to a second project of the plurality of projects, wherein the second data specifies one or more second milestones achieved respectively by one or more of the second tasks of the second project, the second project being different from the first project;

providing for display, in an integrated progress view, a first representation of a sequencing of the plurality of first tasks and a respective visual indicator for each task representing a respective milestone for the task;

providing for display, in the integrated progress view, a second representation of a sequencing of the plurality of second tasks and a respective visual indicator for each task representing a respective milestone for the task;

receiving a user selection of the first project displayed in the integrated progress view;

generating, for each of a plurality of time periods, a respective measure of velocity for the first project, each respective measure of velocity in each time period representing a measure of progress for the first tasks belonging to the first project that were achieved in the time period; and in response to receiving the user selection of the first project, providing for display in the integrated progress view, a representation of velocity of the first project over time according to the computed measures of velocity for each of the plurality of time periods.

2. The method of claim 1, wherein providing for display the respective visual indicators comprises, for each visual indicator:
  displaying a background and a banner over the background, the background having a background color, shade or pattern, the background color, shade or pattern indicating a type of a feature of the first project, the banner having a banner color, banner shade or banner pattern indicating first progress or second progress as measured against the one or more first or second milestones.

3. The method of claim 1, comprising:
  providing for display, in the integrated progress view, a summary visual indicator indicating a summary velocity at which the first project and the second project are completed.

4. The method of claim 1, wherein each of the first project and second project is associated with a respective label, each label being associated with a respective display item that, upon being selected, triggers a display of a grouping of visual indicators corresponding to the plurality of tasks belonging to the projects being associated with the selected label.

5. The method of claim 4, wherein each label, upon selection, further triggers a display in the integrated progress view of an aggregated velocity indicator of respective progresses of the plurality of tasks belonging to the projects being associated with the selected label.

6. The method of claim 1, wherein each of the first visual indicator and second visual indicator is associated with a respective health indicator indicating potential roadblocks of the respective progress and a respective digital gauge presenting metrics of the respective progress.

7. The method of claim 1, wherein each of the first visual indicator and second visual indicator includes, respectively,
  a first section corresponding to a first feature, and
  a second section corresponding to a second feature, wherein each section having a respective size that corresponds to a number of tracker points in a corresponding feature.

8. The method of claim 1, wherein each velocity is represented in a summary velocity chart in the integrated view.

9. The method of claim 8, wherein the summary velocity chart includes a velocity per participant indicator indicating the velocities averaged over number of project participants.

10. A system comprising:
  one or more computers; and
  one or more storage devices on which are stored instructions that are operable, when executed by the one or more computers, to cause the one or more computers to perform operations comprising:
  receiving first data representing a plurality of first tasks belonging to a first project of a plurality of projects, wherein the first data specifies one or more first milestones achieved respectively by one or more of the first tasks belonging to the first project;
  receiving second data representing a plurality of second tasks belonging to a second project of the plurality of projects, wherein the second data specifies one or more second milestones achieved respectively by one or more of the second tasks of the second project, the second project being different from the first project;
  providing for display, in an integrated progress view, a first representation of a sequencing of the plurality of first tasks and a respective visual indicator for each task representing a respective milestone for the task;
  providing for display, in the integrated progress view, a second representation of a sequencing of the plurality of second tasks and a respective visual indicator for each task representing a respective milestone for the task;
  receiving a user selection of the first project displayed in the integrated progress view;
  generating, for each of a plurality of time periods, a respective measure of velocity for the first project, each respective measure of velocity in each time period representing a measure of progress for the first tasks belonging to the first project that were achieved in the time period; and
  in response to receiving the user selection of the first project, providing for display in the integrated progress view, a representation of velocity of the first project over time according to the computed measures of velocity for each of the plurality of time periods.

11. The system of claim 10, wherein providing for display the respective visual indicators comprises, for each visual indicator:
  displaying a background and a banner over the background, the background having a background color, shade or pattern, the background color, shade or pattern indicating a type of a feature of the first project, the banner having a banner color, banner shade or banner pattern indicating first progress or second progress as measured against the one or more first or second milestones.

12. The system of claim 10, the operations comprising:
  providing for display, in the integrated progress view, a summary visual indicator indicating a summary velocity at which the first project and the second project are completed.

13. The system of claim 10, wherein each of the first project and second project is associated with a respective label, each label being associated with a respective display item that, upon being selected, triggers a display of a grouping of visual indicators corresponding to the plurality of tasks belonging to the projects being associated with the selected label.

14. The system of claim 13, wherein each label, upon selection, further triggers a display in the integrated progress view of an aggregated velocity indicator of respective progresses of the plurality of tasks belonging to the projects being associated with the selected label.

15. A non-transitory storage device storing instructions that are operable, when executed by one or more computers, to cause the one or more computers to perform operations comprising:
  receiving first data representing a plurality of first tasks belonging to a first project of a plurality of projects, wherein the first data specifies one or more first milestones achieved respectively by one or more of the first tasks belonging to the first project;
  receiving second data representing a plurality of second tasks belonging to a second project of the plurality of projects, wherein the second data specifies one or more second milestones achieved respectively by one or more of the second tasks of the second project, the second project being different from the first project;
  providing for display, in an integrated progress view, a first representation of a sequencing of the plurality of first tasks and a respective visual indicator for each task representing a respective milestone for the task;
  providing for display, in the integrated progress view, a second representation of a sequencing of the plurality of second tasks and a respective visual indicator for each task representing a respective milestone for the task;

receiving a user selection of the first project displayed in the integrated progress view;

generating, for each of a plurality of time periods, a respective measure of velocity for the first project, each respective measure of velocity in each time period representing a measure of progress for the first tasks belonging to the first project that were achieved in the time period; and in response to receiving the user selection of the first project, providing for display in the integrated progress view, a representation of velocity of the first project over time according to the computed measures of velocity for each of the plurality of time periods.

16. The non-transitory storage device of claim 15, wherein each of the first project and second project is associated with a respective label, each label being associated with a respective display item that, upon being selected, triggers a display of a grouping of visual indicators corresponding to the plurality of tasks belonging to the projects being associated with the selected label.

17. The non-transitory storage device of claim 16, wherein each label, upon selection, further triggers a display in the integrated progress view of an aggregated velocity indicator of respective progresses of the plurality of tasks belonging to the projects being associated with the selected label.

18. The non-transitory storage device of claim 15, wherein each of the first visual indicator and second visual indicator is associated with a respective health indicator indicating potential roadblocks of the respective progress and a respective digital gauge presenting metrics of the respective progress.

19. The non-transitory storage device of claim 15, wherein each of the first visual indicator and second visual indicator includes, respectively, a first section corresponding to a first feature, and a second section corresponding to a second feature, wherein each section having a respective size that corresponds to a number of tracker points in a corresponding feature.

20. The non-transitory storage device of claim 15, wherein each velocity is represented in a summary velocity chart in the integrated view.

* * * * *